Sept. 12, 1967 C. M. HUNTER 3,340,731
INSTRUMENT FOR AIR VEHICLES
Filed July 1, 1965 4 Sheets-Sheet 1
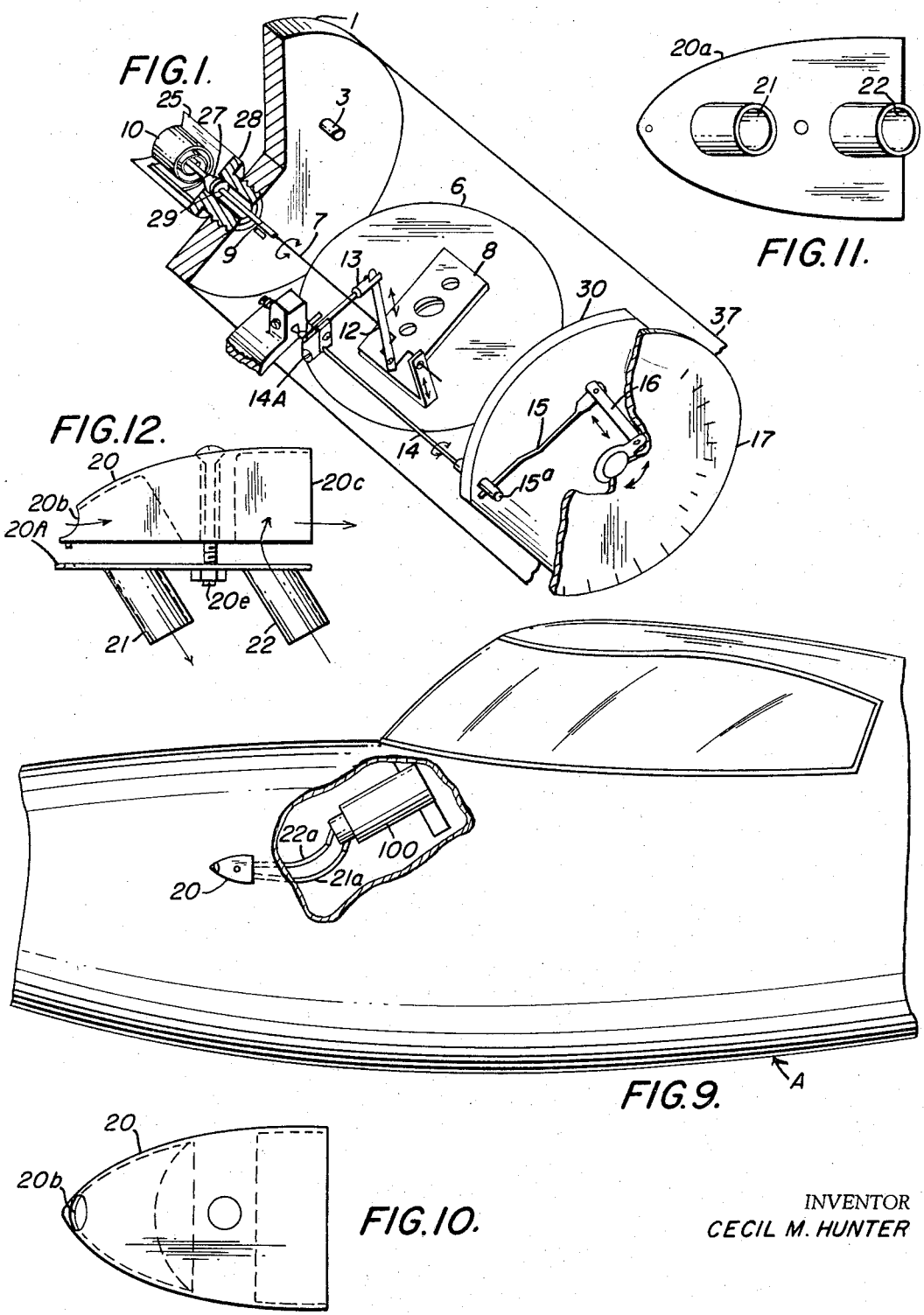
INVENTOR
CECIL M. HUNTER Sept. 12, 1967 C. M. HUNTER 3,340,731
INSTRUMENT FOR AIR VEHICLES
Filed July 1, 1965 4 Sheets-Sheet 2

INVENTOR
CECIL M. HUNTER

INVENTOR
CECIL M. HUNTER

Sept. 12, 1967     C. M. HUNTER     3,340,731
INSTRUMENT FOR AIR VEHICLES
Filed July 1, 1965     4 Sheets-Sheet 4
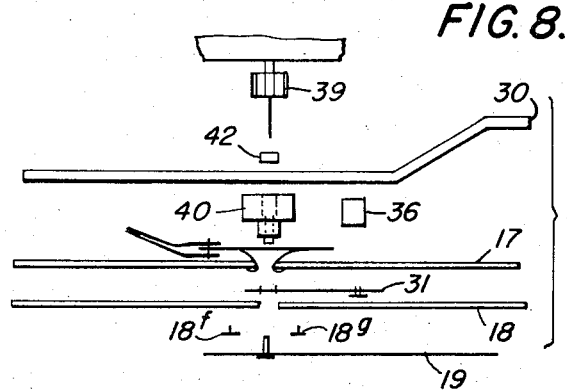
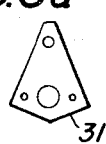
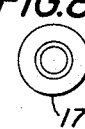
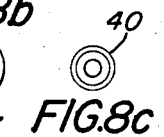
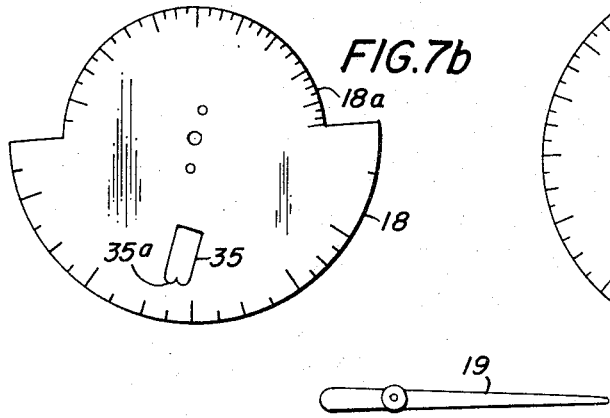
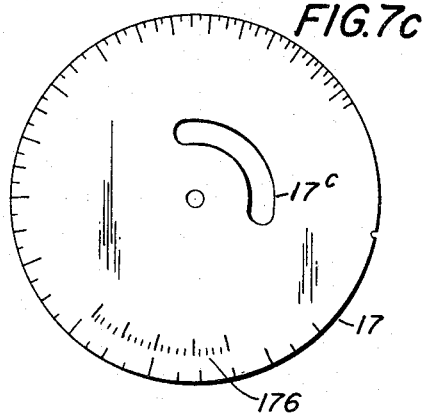
INVENTOR
CECIL M. HUNTER United States Patent Office 3,340,731
Patented Sept. 12, 1967

3,340,731
INSTRUMENT FOR AIR VEHICLES
Cecil M. Hunter, Box 7055, Tulsa, Okla. 74105
Filed July 1, 1965, Ser. No. 468,800
13 Claims. (Cl. 73—182)

This invention relates to an instrument for use on a space vehicle, such as aircraft, in which indicated air speed is automatically converted to true air speed and/or distance for take off whereby all indicators can be read from a single instrument and it relates more specifically to a single instrument from which simultaneous readings can be made of indicated air speed, true air speed and distance for take off without the need manually to calculate true air speed or distance for take off from indicated air speed, as by means of a computer or the like.

It is known that the indicated air speed is a function of air pressure as applied to the ship or Pitot head and is readable on a pressure responsive meter calibrated in m.p.h. or in nautical miles. Since air is heavier at sea level that at higher altitudes, the same indicated air speed will give a higher heading in m.p.h. at ground level than at higher altitudes. For example, an aircraft flying at a height of 10,000 feet, with an outside temperature of 15° C., may show an indicated air speed of only 150 m.p.h. while the aircraft is actually flying at a true speed of 180 m.p.h. At the present time, conversion of indicated air speed to true air speed is made by calculation with a hand operated computer.

It is an object of this invention to eliminate the need for computer calculations for conversion of indicated air speed to true air speed and/or to distance for take off.

More specifically, it is an object of this invention to provide a single instrument which operates automatically to take into consideration outside temperature, outside altitude pressure and static air density for conversion of indicated air speed to true air speed and/or distance for take off whereby all readings can be made directly from a single instrument without the necessity for calculations to convert one to the other and with less possibility of error.

A further object is to provide a single instrument of the type described which is simple in construction, which is accurate and dependable in operation; which is constructed of relatively few simple parts which are easily assembled into a compact instrument of rugged construction; which is easy to adjust and easy to service; and from which the two separate readings of indicated speed and true speed can be made from a single needle movable over the face of dials and a third separate reading of distance for take off can be made from a window in the fact of the same dials, all in front of the pilot, for instant reading.

These and other objects and advantages of this invention will hereinafter appear and for purposes of illustration, but not of limitation, an embodiment of the invention is shown in the accompanying drawings, in which—

FIG. 1 is a perspective view of the instrument embodying the features of this invention with portions cut away for a better view of elements within the interior of the instrument;

FIGS. 7a, 7b, and 7c are elevational views of elements making up the dial system in the instrument of FIG. 1;

FIG. 8 is a view showing the elements making up the dial system in their relative positions for assembly;

FIGS. 8a, 8b, 8c and 8d are elevational views of several componets of the dial system of FIG. 8;

FIG. 9 is an elevational view of the nose piece of an aircraft showing the instrument mounted therein;

FIG. 10 is a top plan view of the scoop for bleeding outside air into the instrument;

FIG. 11 is a plan view from the bottom side of the back-up plate secured to the underside of the air scoop; and FIG. 12 is an elevational view showing the elements making up the air scoop and back-up plate in their separated relation.

The operation of the instrument of this invention is based upon the theory that indicated air speed will vary in relation to variable altitude pressure and temperature. Thus the instrument is operated by movement of a true air speed dial relative to the indicated air speed dial in response to the altitude pressure and temperature whereby an instantaneous direct reading can be made on the instrument panel of both indicated air speed and true air speed. Since true air speed has to do with the density of the air, distance for take off can be shown in the same instrument as a reading from the true air speed dial, but from a different scale.

Figure 4:
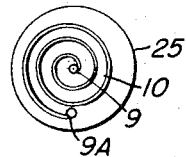
FIG. 4 is an elevational view of the bimetallic coil which is responsive to temperature.
Figure 2:
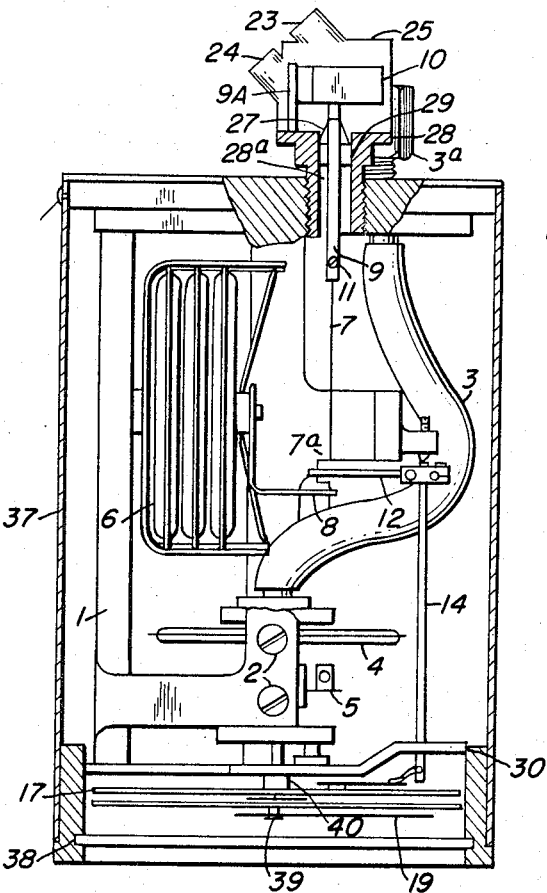
FIG 2 is a side elevational view, partially in section, showing the interior of the instrument of FIG. 1.
Figure 3:
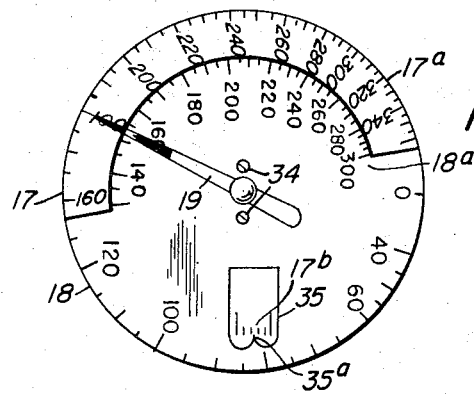
FIG. 3 is a front elevational view of the face of the instrument of FIG. 1.

Having described the theory of operation, reference will now be made to the drawings for a description of one embodiment of the invention. The instrument 100 is made up of a cylindrical enclosure or casing 37 having a window 38 at the front end for observation into the instrument of the indicated air speed dial 18, the true air speed dial 17 and the needle 19. As will be seen from FIGS. 3 and 7, the indicated air speed dial 18 is provided with a logarithmic scale 18ª calibrated in m.p.h and a peripheral portion of the indicated air speed dial 18 is cut away to disclose a portion of the true air speed dial 17 marked with a logarithmic scale 17ª which is also calibrated in m.p.h. It will be understood that instead of forming the indicated air speed dial 18 with a cutout portion for observation of the rearwardly spaced true air speed dial 17, the latter can be formed of a disc member having a radius greater than that of the indicated air speed dial 18 so as to provide for a peripheral portion extending outwardly beyond the dial 18 for reading the scale. A spaced portion of the true air speed dial is provided with another scale 17ᵇ calibrated for distance for take off and observation thereof is made through a window 35 in the corresponding portion of the indicated air speed dial 18 with a portion of the window cut out to provide a pointer 35ª for use in direct reading of the scale 17ᵇ. Similarly, the distance for take off scale 17ᵇ can be provided on a peripheral portion of the true speed indicator dial 17 which extends beyond the indicated air speed dial 18 with a suitable fixed arrow point on the periphery of the dial 18.

The indicated air speed dial 18 is fixed in position while the true air speed dial 17 is mounted for rotational movement relative to the indicated air speed dial about a common axis in response to altitude pressure and temperature, or as will hereinafter be pointed out. The needle 19 is keyed onto a shaft 39 which extends rearwardly through central apertures in the dials 17 and 18 and through a fixed supporting sleeve 40 to enable relative rotational movement. The sleeve 40 operates as a bearing support for the true air speed dial and a jewel 42 is fixed in the sleeve for use as a bearing support for the rotatable shaft 39 onto which the needle 19 is keyed.

The shaft 39 and needle 19 are responsively powered by the indicated air speed mechanism 5 which is of conventional construction. Since such indicated air speed mechanism is a well known article of commerce, detailed description thereof will not be given. Suffice it to say that it is powered by a bellows 4 which is responsive to pressure outside the aircraft A via tube 3 and the fitting 3a.

Adjustment of indicated air speed to true air speed in response to altitude pressure is effected by means of a bellows 6 mounted, as by screws, to depend from a frame secured in the casing 37 for expansion and contraction of the bellows in a vertical direction in response to static pressure. Fixed to the lower movable wall of the bellows is a bracket 8 which is operatively connected to an elongate crank arm 7 having an offset 7a which operates as a crank on which an end portion of a connecting link 12 is rotatably connected for rocking movement of the link 12 responsive to turning movement of the crank arm 7. The connecting link 12 is in turn fixed onto an end of a linking member 13 and adjustment bracket 14a which mounts an elongate shaft 14 defining the axis about which the links 12 and 13 and the adjusting bracket 14a may be rocked to transmit rocking movement of the links 12 and 13 into turning movement of the shaft 14 about its axis.

Figure 5:
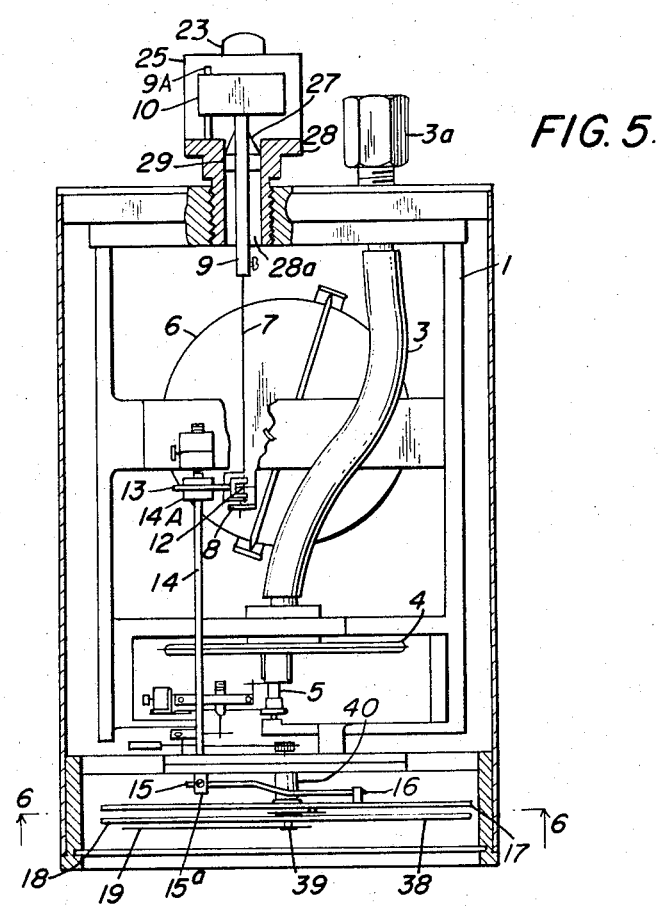
FIG. 5 is a top plan view, partially in section, showing the interior of the instrument of FIG. 1.
Figure 6:
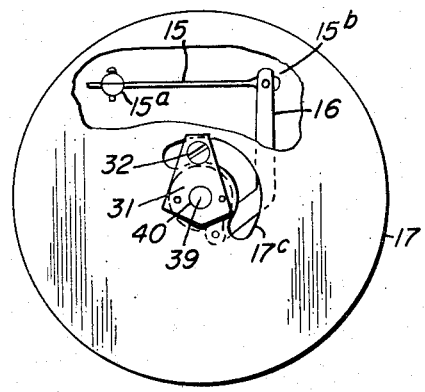
FIG. 6 is a view taken along the line 6—6 of FIG. 5 with portions of the dial cut away to show the linking mechanism.

The shaft 14 extends forwardly through an opening in a frame plate 30 to a bracket 15a which releasably engages a crosswise extending arm 15 which is pivotally connected at its outer end 15b to a lift link 16 connected to a portion of the dial 17 which is offset from its center. Thus rotational movement of the shaft 14 is converted into rocking movement of the cross arm 15 with the axis of the shaft 14 as its pivot and such rocking movement of the cross arm 15 is converted to rotational movement of the true air speed dial 17 about its axis (see FIGS. 5 and 6).

Thus it will be seen that rotational movement of the crank arm 7 is transmitted through linkages to effect rotational movement of the true air speed indicator dial 17 in response to static pressure on the bellows. The temperature effect is superimposed on the crank arm 7 for adjustment of the true air speed dial in response to temperature. It is the combination of movements imposed on the crank arm 7 responsive to the pressure effect on the bellows and temperature effect on the arm that gives the final resultant adjustment to the true air speed indicator dial 17 for true air speed reading and distance for take off.

For this purpose, the rearward end portion of the crank arm 7 is secured, as by means of setscrew 11, to the forward end portion of a shaft 9 which is fixed at its other end portion to the inner convolution 9b of a bimetallic leaf coil 10 having its outer end portion 9a fixed, as by brazing, to the stationary temperature housing 28, whereby turning movement is imparted to the shaft 9 and the attached crank arm 7 in response to the adjustment of the bimetallic coil due to change in temperature. Such turning movement of the crank arm is, in turn, transmitted through the linkages previously described to the true air speed indicator dial 17 for adjustment about its axis in response to temperature effect.

The bimetallic temperature responsive coil 10 is exposed to the outside air temperature which is brought in through scoop 20 (see FIGS. 9–12) mounted on the nose piece of the aircraft A. Scoop 20 has an air inlet 20b and a separate rearwardly spaced air outlet 20c. The underside of the air scoop 20 is adapted to receive a back-up plate 20a having a passage 21 in communication with the air inlet 20b and a passage 22 in communication with the air outlet 20c. The back-up plate is secured in position of use on the underside of the air scoop, as by bolt and nut means 20e. Tubes 21a and 22a connect the air inlet passage 21 and the air outlet passage 22 with the inlet 24 and outlet 23 respectively in communication with the interior of the chamber 25 in which the temperature coil 10 is located thereby to provide for uninterrupted flow of outside air to the coil 10 for immediate response to outside temperature. Shaft 9 is rotatably supported intermediate its ends by a bearing member 29 received in fitting relationship within the bore 28a through the temperature housing 28 and through which the shaft 9 extends.

Since the enclosure, in which the bellows 6 is housed, must be air tight, means are provided for effecting a sealing relationship between the interior of the temperature housing 25 and the enclosure 37. For this purpose, use is made of a boot 27 in the form of a triangular section of elastic material which is sealed at its outer apices to the surrounding wall of the bore through the temperature housing while it is sealed at its other end about the shaft 9. Since the boot 27 is formed of elastic material and is relatively insensitive to cold and to heat, it offers no appreciable resistance to the torque of shaft 9 in turning movement in response to temperature change. Thus the interior of the casing 37 is sealed so that it maintains static pressure necessary for operation of the bellows 6 responsive to altitude pressure.

Such static pressure is taken in the normal way from a neutral spot on the outside of the aircraft through air tight tubes and brought into the instrument through an aperture that is threaded in the end plate of the instrument frame 1 so that it will hold regular aircraft tube fittings. The end plate, which is part of the frame 1, is sealed in the normal way, such as with an O-ring, to seal the cylindrical casing 37.

Since the static pressure within the casing is responsive to the atmospheric pressure on the outside of the aircraft, the pressure variance with altitude will change the pressure conditions existing within the casing 37. Thus the bellows 6 will expand or contract as the aircraft changes altitude. The pressure sensitive bellows 6 constitutes a power source for operation of the connecting linkages to effect rotational adjustment of the true air speed indicator dial 17. Similarly, the bimetallic coil 10 constitutes the power source which operates many of the linkages common with the bellows for rotational adjustment of the same true air speed indicator dial 17. This combination of power sources from the altitude bellows 6 and the temperature coil 10 operates to furnish the proper rotational movement of the true air speed indicator dial 17, as related to density air. Thus the indicater air speed measures the air flowing about the aircraft A in flight while the true air speed component described superimposes air density altitude pressure and temperature to indicate true air speed in m.p.h. or knots thereby to show both from the same instrument.

As previously pointed out, since the true air speed indicator dial 17 is rotated in relation to density air, it is possible to make use of a calibrated scale 17b for use in reading ground roll and distance for take off either in percentage or in feet, as specified for the particular aircraft design. Since the aircraft responds to density air, the instrument is adapted to show various ground roll distances at different altitudes and temperatures through the window 35 of the dial 18 from a scale 17b which, as previously described, is fully responsive to density air.

In assembly, the true air speed indicator dial 17 is mounted for rotational movement about the sleeve 40 which is press fit into a bore through the frame plate 30. Bearing 42 is in turn press fit within the sleeve 40 for bearing support of the pinion gear shaft 39 powered by the indicated air speed mechanism 5.

A plate 31 (see FIGS. 6 and 7) fits onto a shoulder on one end of the sleeve 40 and is secured by sleeve 36 to the frame plate 30, as by means of a screw. Dial 17 is provided with an arcuate slot 17c through which the spacer 36 can extend without interfering with rotational movement of the dial, thereby to hold dial 17 in position without restricting its turning movement. Dial 18 is fixed onto dial plate 31, as by means of screws 18f and 18g. Shaft 39 extends through openings in the aforementioned parts to provide a through-extending end portion onto which the needle 19 is secured. Thus needle 19 responds only to the indicated air speed mechanism but points to the indicated air speed scale 18ᵃ and to the true air speed scale 17ᵃ on the dial 17 which is rotated to the corrected position for true air speed. Such instruments, embodying the features of this invention, have been operated with less than 2% air at temperatures ranging from 40° C. to −50° C. and at altitudes up to 3500 feet during several hundred hours of flight tests.

It will be apparent from the foregoing that I have provided a simple and efficient means in the form of an instrument in which adjustments are automatically and immediately made in response to static air pressure and temperature to enable reading of the true air speed and/or distance for take off without the necessity for hand calculations from indicated air speed.

It will be understood that the indicators responsive to indicated air speed and true air speed may be reversed to make the movable needle 19 responsive for adjustment based on altitude air density and temperature and to make the movable dial 17 responsive to indicated air speed or dynamic pressure on the air vehicle.

It will be understood that changes may be made in the details of construction, arrangement and operation without departing from the spirit of the invention, especially as defined in the following claims.

I claim:

1. An instrument of the type described for an air vehicle comprising in combination a fixed indicated air speed dial, a needle mounted for movement relative to the indicated air speed dial over the face thereof, a first diaphragm mounted for movement responsive to dynamic pressure on the moving vehicle, an operative connection between said first diaphragm and the needle for movement of the needle responsive to movement of the diaphragm to adjust for indicated air speed, a second indicator means mounted for movement relative to the fixed indicator means and needle with calibrations thereon for true air speed, a bellows mounted for movement responsive to static pressure, a temperature responsive coil exposed to outside air temperature, a rod mounted for rotational movement, means connecting the rod with the coil for rotational movement of the rod responsive to temperature change, separate means connecting the rod with the bellows for translatory motion of at least a portion of the rod responsive to changes in static pressure, and means coupled between said portion of said rod and said second indicator means for movement of said second indicator means responsive to said rotational movement of the rod and to translatory motion of said portion of the rod, whereby said needle indicates true air speed on said second indicator means.

2. An instrument as claimed in claim 1 in which the needle is mounted for rotational movement about an axis and in which the second indicator means comprises a dial mounted for rotational movement about an axis common with the needle.

3. An instrument as claimed in claim 1 in which the operative connection between the first diaphragm and the pointer comprises interconnecting link and crank arm members.

4. An instrument as claimed in claim 1 in which the second indicator means comprises a dial mounted for rotational movement relative to the indicated speed dial.

5. An instrument as claimed in claim 1 in which the calibrations on the true speed indicator dial underlie the indicated speed dial and in which the portion of the indicated speed dial overlying the calibrations is cut away to expose the true air speed dial indications.

6. An instrument as claimed in claim 1 in which the temperature coil is a bimetallic temperature coil.

7. An instrument as claimed in claim 1 in which the outer end portion of the temperature coil is fixed and the twist rod is connected to the inner end portion of the temperature coil for twisting movement of the rod in response to temperature change.

8. An instrument as claimed in claim 1 in which the temperature coil is located in an enclosed chamber having an inlet and an outlet, means for exposing the temperature coil to outside air temperature comprising a scoop mounted on the outside of the vehicle having an inlet passage and an outlet passage extending therethrough and separate conduits, one connecting the inlet passage with the inlet to the chamber and another connecting the outlet passage to the outlet in the chamber for the continuous flow of outside air through the chamber.

9. An instrument as claimed in claim 8 in which the scoop is mounted on the vehicle with the inlet to the inlet passage facing in a direction of vehicle movement and with the outlet from the outlet passage facing in a direction away from the direction of vehicle movement.

10. An instrument of the type described for an air vehicle comprising in combination a first indicator means and a second indicator means, means mounting each of said first and second indicator means for independent movement relative one to the other, a first diaphragm means, means connecting said first diaphragm means with the air on the moving vehicle for movement responsive to dynamic pressure on the vehicle, and an operative connection between said first diaphragm means and said first indicator means for movement of the latter commensurate with indicated air speed, a second diaphragm means responsive in translatory movement to static pressure, a temperature coil, means for spacing said temperature coil to measure air temperature outside the moving air vehicle, a rod mounted for rotational movement, means connecting the rod with the coil for rotational movement of the rod responsive to temperature changes, means connecting the rod with the second diaphragm means for translatory movement of at least a portion thereof responsive to translatory movement of said second diaphragm means, and means responsive both to translatory motion of said portion of said rod and to rotational movement of said rod for moving said second indicator means, whereby the combined effect adjusts for true air speed, and calibrations on said second indicator means on which true air speed is indicated by said first indicator means.

11. An instrument as claimed in claim 10 in which the first indicator means is a needle and the second indicator means is a dial having markings thereon for true air speed and in which both the needle and dial are mounted for independent rotational movement about a common axis.

12. An instrument as claimed in claim 11 which includes a fixed indicated speed dial for calibrations thereon from which indicated speed can be read from the needle.

13. An instrument as claimed in claim 12 in which the true air speed dial bears markings for distance to take-off and wherein the indicated air speed dial has a pointer for indicating distance to take-off.

References Cited

UNITED STATES PATENTS

| | | | |
|---|---|---|---|
| 2,251,498 | 8/1941 | Schwien | 73—182 |
| 2,842,091 | 7/1958 | Kennedy | 73—182 |
| 2,927,460 | 3/1960 | Darbujan | 73—182 |
| 3,104,547 | 9/1963 | Suits et al. | 73—181 |
| 3,126,737 | 3/1964 | Gibbs | 73—181 |
| 3,257,846 | 6/1966 | Hunter | 73—182 |

OTHER REFERENCES

Aviation Week, June 23, 1958, pp. 65, 67, 69, 70, and 71.

Aviation Week, July 28, 1958, pp. 77, 78, and 79.

Aviation Week, Oct. 13, 1958, pp. 99, 100, 103, and 105.

LOUIS R. PRINCE, *Primary Examiner.*

DAVID SCHONBERG, *Examiner.*

N. B. SIEGEL, *Assistant Examiner.*